July 21, 1925.

M. C. DART 1,546,569

AUTOMOBILE COLD AIR DEFLECTOR

Filed March 1, 1920

INVENTOR
MELVIN C. DART

ATTORNEY

Patented July 21, 1925.

UNITED STATES PATENT OFFICE.

MELVIN C. DART, OF NEW YORK, N. Y.

AUTOMOBILE COLD-AIR DEFLECTOR.

Application filed March 1, 1920. Serial No. 362,390.

*To all whom it may concern:*

Be it known that I, MELVIN C. DART, a citizen of the United States, and a resident of the city of New York, Bronx County, and State of New York, have invented certain new and useful Improvements in Automobile Cold-Air Deflectors, of which the following is a full, clear, and exact description.

Among the principal objects which the present invention has in view are: to avoid cooling the carburetor or gasoline distributing station connected therewith during the operation of the engine; to promote vaporization of the gasoline by utilizing the heat of the engine for warming the carburetor and distributing station connected therewith; to utilize the heat of the engine of an automobile for heating the body of the automobile during weather requiring the same; to avoid the heat during the warm season; and to simplify and cheapen the apparatus for accomplishing the above-mentioned purposes.

Drawings.

Figure 1:
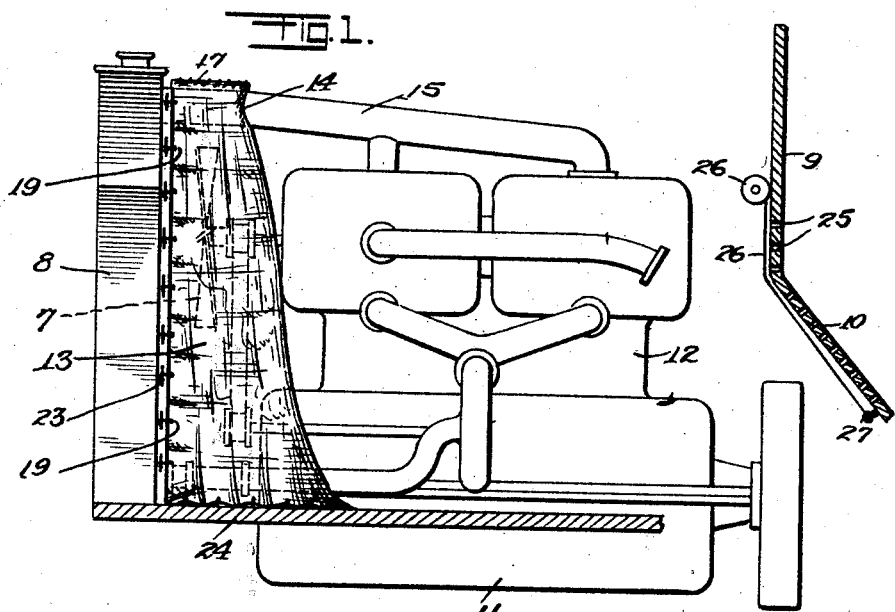
Figure 1 is a side view of an automobile engine showing a cold air deflector mounted thereon and constructed and arranged in accordance with the present invention.

Description.

As at present constructed, an automobile during the cold season, as well as the warm, draws air by means of a rapidly moving fan 7, through a radiator 8. The cold air thus drawn is only partially heated in its rather short passage through the radiator. This cold air is driven backward by the fan and by the motion of the car to impinge on the motor, carburetor and parts associated therewith, dash 9 of the automobile and upon the footboard 10 thereof. Moreover, drivers of automobiles in excessively cold weather suffer particularly from cold feet, due to the fact that the cold wind driven back by the fan 8 and induced by the motion of the automobile, passes the engine and parts thereof without being properly heated, and is usually delivered through the slots or orifices in which the foot lever controls for the automobile extend. Intensely cold air is thus precipitated upon the feet of the chauffeur.

The present invention has for its object primarily to deflect the air taken through the radiator 8 and moved by the fan 7, so as to deliver the same below the crank case 11 of the engine 12. The current thus induced would carry the cold air down over the mudguard with which the automobile is provided, and well below the footboard 10 or the dash 9. This is accomplished in accordance with the present invention by forming a deflector 13, which may be secured in position as shown best in Figure 1 of the drawings, at the rear of the fan, to extend down in front of the engine block and wrap closely about the crank case 11, so as to deflect the air coming through the radiator 8 toward the mud pan below the engine structure.

Figure 2:
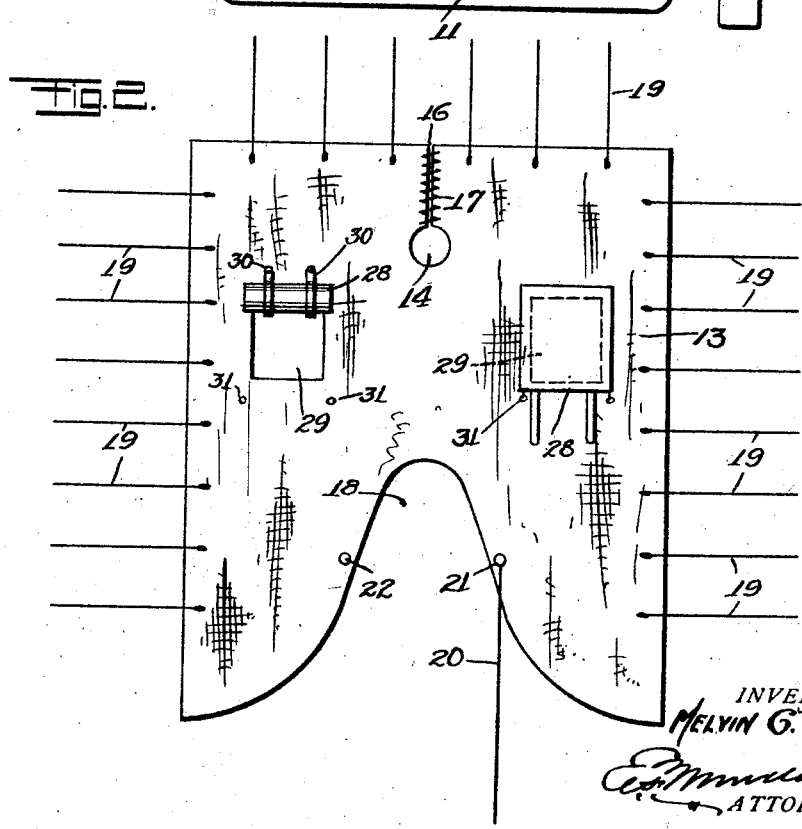
Figure 2 is a side view of the deflector shown as removed from the engine and in condition to be secured thereto.

As shown best in Figure 2 of the drawings, the deflector 13 is provided with an opening 14, through which in service passes the return water pipe 15 of the circulatory system for the water jackets of the engine 12. An opening 16 is made in the deflector 13 between the opening 14 and the forward edge of the said deflector. The opening is closed by a lacing 17, when the deflector is adjusted to its active working position. A throat 18 is formed for straddling the crank case 11 and parts associated therewith. The deflector is furnished with a number of short ends of cord 19, by which the various edges of the shield are held in operative relation to the radiator and frame of the chassis. A relatively long cord 20 is fastened at one end by a button 21 to the shield and is adapted for engaging a second button 22 at the opposite side of the throat 18. The cord 20 is in service passed down under the crank case 11 and parts associated therewith and drawn taut to be secured to the button 22. This holds the rear of the shield firmly in position directly behind and in line with the fan 7.

When the various short ends 19 are secured to the packing string 23 for the radiator and hood, and to convenient parts of or associated with the side bar 24 of the chassis, it will be found that the cold air thereafter drawn by the fan 7 through the radiator 8 will be carried by the deflector to below the crank case of the engine, and into the space above the mudguard with which the engine is provided.

This permits the heat of the engine to be utilized for heating the body of the car directly behind it, or that portion of the car which is usually occupied by the chauffeur. To this end the dashboard 9 and the footboard 10 are provided with a series of perforations 25. The perforations 25 permit the heated air to rise into the space behind the dashboard and above the footboard which operates to provide warmth for the chauffeur.

When the weather is warm enough to make it desirable to avoid heat, the curtain 26 is drawn down over the perforations 25, and held in operating position by the hook 27. The deflector 13 is then removed from service. With the arrangement thus made the automobile and the chauffeur's driving station therefor is placed in the position previously enjoyed.

In some instances, I provide small side curtains 28 which normally cover the openings 29 formed in the deflector 13. When desired these curtains may be rolled as shown on the left side of Figure 2 of the drawings and secured in raised position by straps 30. The curtains are fastened in lower position by being secured by buttons 31. This expedient is employed for modifying the effect of the deflector 13 as when during the day the weather modifies and it is desirable to permit some of the cooling air to travel back into the engine space for assisting in cooling the engine and parts connected therewith.

While the invention has been described as a device for promoting the heating of the car body and particularly of the portion thereof adjacent to the dashboard and footboard, it will be understood that the deflection of the cold air as indicated also protects the carbureter and a vacuum tank if the car be provided with one from the cooling effect of the air drawn in by the fan.

It is obvious that if the cool currents of air are deflected from the carbureter and gasoline distributing system connected therewith, the heat of the engine will materially assist in the operation of the carbureter to modify advantageously the effect of cold weather thereon.

While I have herein described the deflector 13 as supported by the water pipe 15 and as held in position by the cords 19 attached to the radiator 8, I may employ other means equally effective, though less desirable, such as providing a spreading hoop or bowed frame on which the deflector is stretched, said frame being disposed so that the deflector stands immediately at the rear of the fan. In this case I extend the fabric of the deflector to form a loose packing to engage the engine hood when the same is lowered in service position thereby preventing the passage of air around the said hoop and deflector. The form shown in the drawings is, however, preferred as being simpler and cheaper of manufacture, and also as offering facility for storing away in the automobile as it may be closely folded to occupy very little space.

*Claims.*

1. An apparatus as characterized comprising a shield embodying passageways for parts of an automobile engine between the air circulating fan and cylinder block of said engine; and a plurality of fastening members for removably securing the edges of said shield to adjacent portions of an automobile structure to insure deflection of air delivered from said fan away from said cylinder block.

2. An apparatus as characterized comprising a shield embodying passageways for parts of an automobile engine between the air circulating fan and cylinder blocks of said engine; a plurality of fastening members for removably securing the edges of said shield to adjacent portions of an automobile structure to insure deflection of air delivered from said fan away from said cylinder block; and means embodying closeable openings in said shield for permitting a regulated amount of the air delivered by said fan to impinge on said cylinder block.

3. An apparatus as characterized comprising a flexible shield shaped to conform with the engine and parts associated therewith between the circulating fan and the cylinder block thereof; means for removably fastening the edges of said shield to the adjacent structure of the automobile; and means for modifying the volume of air deflected by said shield.

4. An apparatus as characterized comprising an adjustable shield for providing passageways for parts of an automobile engine between the air circulating fan and cylinder block of said engine; a plurality of adjustable fastening members for securing the edges of said shield to adjacent portions of an automobile structure to insure the deflection of air delivered from said fan away from said cylinder block; and means establishing air communication between the space occupied by the engine and the driving controls of the automobile.

5. An apparatus as characterized comprising an adjustable shield for providing passageways for parts of an automobile engine between the air circulating fan and cylinder block of said engine; a plurality of adjustable fastening members for securing the edges of said shield to adjacent portions of an automobile structure to insure the deflection of air delivered from said fan away from said cylinder block; and adjustable means for regulating air communication between the space occupied by the engine and the driving controls of the automobile.

6. An apparatus as characterized comprising an adjustable shield for providing passageways for parts of an automobile engine between the air circulating fan and cylinder block of said engine; a plurality of adjustable fastening members for securing the edges of said shield to adjacent portions of an automobile structure to insure the deflection of air delivered from said fan away from said cylinder block; and adjustable means for regulating air communication between the space occupied by the engine and the driving controls of the automobile, said means embodying a footboard perforated for communication with the space occupied by said cylinder block, and an adjustable curtain for partially closing the same.

7. An apparatus as characterized comprising a flexible box-like member conforming in shape to the radiator of an automobile for encasing the radiator fan of said automobile; means for attaching in service said box-like member, said means embodying devices for engaging in service the anti-rattling lacings of an automobile adjacent the radiator of said automobile.

MELVIN C. DART.